3,218,341
3β,16α-SUBSTITUTED 20-METHYL-
PREGNAN-20-OLS
Leslie A. Freiberg, Waukegan, and John Wayne Cole, Deerfield, Ill., assignors to Abbott Laboratories, North Chicago, Ill., a corporation of Illinois
No Drawing. Filed Mar. 27, 1964, Ser. No. 355,500
9 Claims. (Cl. 260—397.4)

The present application is a continuation-in-part of our copending application, Serial No. 294,763, filed July 12, 1963, now abandoned.

The present invention is directed to a class of new steroids. More particularly, it relates to 3,16,20-substituted pregnanes, e.g., 20-methyl-5α-pregnane-3β,16α,20-triol, a method for their preparation, and some new intermediates.

The object of the present invention is the provision of compounds of the formula

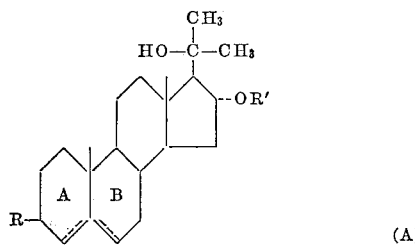

(A)

wherein R is HO, O, or R″COO, and wherein R′ is hydrogen, R″CO, or benzyl, wherein R″ is a loweralkyl group; the 5-position carries an α-hydrogen or a double-bond.

The new compounds are hormonally active; specifically, they are active as anabolic agents in warm-blooded animals. They are also important as intermediates for the manufacture of other 20-tertiary alcohols carrying in the 3- and/or 16-positions ether or ester groups of simple organic alkyl or acyl groups.

In a simple embodiment, a compound of the formula

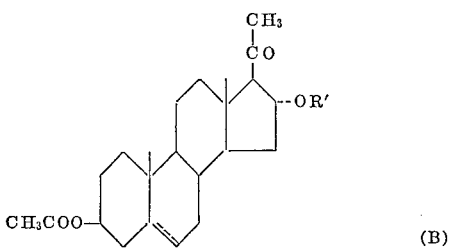

(B)

wherein R′ is benzyl or acyl and wherein the 5-position carries a double-bond to 6 or a hydrogen atom, is reacted with a methyl-Grignard reagent under conventional Grignard conditions and the obtained 16α-benzyloxy- or 16α-acyloxy-20-hydroxy-20-methyl-steroid is hydrolyzed to the corresponding 3β,16α,20-trihydroxy-steroid carrying in the 5-position an α-hydrogen or a double-bond connecting to the 6-position. The conventional Grignard conditions referred to above signify that the methyl-Grignard reagent and the 20-ketosteroid are brought together in a non-aqueous solvent such as diethyl ether (hereinafter simply referred to as ether), dimethyl ether, ethyl methyl ether, tetrahydrofuran or the like, and that the reaction is preferably carried out at a temperature between −10° C. and room temperature. The methyl-Grignard reagent referred to herein relates to compounds of the formula $CH_3M_gX$ wherein X is a halogen with an atomic weight above 20.

To better understand the method of making the new steroids of formula A, reference is made to the following examples which are given here as illustrations only and are not meant to limit the invention.

Example 1.—3β,16α-diacetoxy-20-methyl-5α-pregnan-20-ol

A solution of 0.837 gram of 3β,16α-diacetoxy-5α-pregnan-20-one (Neher et al., Helv. Chim. Acta, volume 41, page 1667, of 1958) in 50 ml. of ether is added within 10 minutes to a stirred solution of methyl magnesium bromide (prepared from 1.22 grams Mg and 4.7 grams $CH_3Br$) in 175 ml. of ether at 0° C. and in a nitrogen atmosphere. The mixture is stirred for 30 minutes at 0° C. after which time 5.4 grams ammonium chloride in 50 ml. water is added. The ether layer is separated, washed with water, and dried over anhydrous magnesium sulfate. Upon evaporation of the ether, 0.780 gram of 3β,16α-diacetoxy-20-methyl-5α-pregnan-20-ol is obtained. The analytical values obtained are in good agreement with the calculated values for the compound of empirical formula $C_{26}H_{42}O_5$.

Example 2.—20-methyl-5α-pregnane-3β,16α,20-triol

A solution of 0.780 gram of 3β,16α-diacetoxy-20-methyl-5α-pregnan-20-ol and 6.0 grams of potassium carbonate in 200 ml. of 75% aqueous methanol is refluxed for 18 hours. The mixture is then diluted with 100 ml. of water to crystallize 20-methyl-5α-pregnane-3β,16α,20-triol. The crystals are filtered, recrystallized from acetone, and dried. The new compound is obtained in a yield of 360 mg. and shows a melting point of 235–40° C. The compound has an empirical formula of $C_{22}H_{38}O_3$.

Example 3.—3β-acetoxy-16α-benzyloxy-20-methyl-5-pregnen-20-ol

A solution of 1.5 grams of 3β-acetoxy-16α-benzyloxy-5-pregnen-20-one (Hirschmann et al., J. Am. Chem. Soc., volume 74, page 539, of 1952) in 55 ml. of anhydrous ether is added within 15 minutes to a stirred solution of methyl magnesium bromide (prepared from 0.785 gram Mg and 3.4 grams $CH_3Br$) in 75 ml. of ether at 0° C. and in a nitrogen atmosphere. The mixture is stirred at 0° for 20 minutes after which time 29.4 ml. of N hydrochloric acid is added. The organic layer is separated, washed with water, and dried over anhydrous magnesium sulfate. After evaporation of the ether, 3β-acetoxy-16α-benzyloxy-20-methyl-5-pregnen-20-ol is obtained in a yield of 1.5 grams. The analytical values correspond with those calculated for the compound of empirical formula $C_{31}H_{44}O_4$.

Example 4.—16α-benzyloxy-20-methyl-5-pregnene-3β,20-diol

A solution of 1.5 grams of 3β-acetoxy-16α-benzyloxy-20-methyl-5-pregnen-20-ol and 2.26 grams of potassium carbonate in 75% aqueous methanol is refluxed for 4 hours. The methanol is then evaporated in vacuo and the product is taken up in ether. After washing this solution with water, drying it over magnesium sulfate and evaporating the ether, 1.39 grams of 16α-benzyloxy-20- methyl-5-pregnene-3β,20-diol is obtained. The analytical data are in agreement with the calculated values for the compound of empirical formula $C_{29}H_{42}O_3$.

*Example 5.—20-methyl-5-pregnene-3β,16α,20-triol*

A solution of 0.70 gram of 16α-benzyloxy-20-methyl-5-pregnene-3β,20-diol in 200 ml. of methanol is shaken in a hydrogen atmosphere at room temperature in the presence of 0.07 gram of palladium supported on charcoal. After absorption of hydrogen ceases, the catalyst is removed by filtration and the methanol is evaporated in vacuo, leaving 0.46 gram of 20-methyl-5-pregnene-3β,16α,20-triol after crystallization from toluene. The new compound has a melting point of 235–40° C. The infrared pattern is in agreement with the pattern expected for this compound and the analytical data of 75.77% C and 10.51% H is in agreement with the values calculated for the compound of empirical formula $C_{22}H_{36}O_3$.

*Example 6.—20-methyl-5α-pregnane-3β,16α,20-triol*

A solution of 0.28 gram of 20-methyl-5-pregnene-3β,16α,20-triol in 100 ml. of 90% aqueous acetic acid is treated with gaseous hydrogen in the presence of 0.1 gram of platinum oxide at room temperature. After the hydrogen absorption ceases, the catalyst is removed and the solution is diluted with 500 ml. of water. The reduced product is extracted with ether and the ether solution washed with aqueous potassium carbonate and water, dried, and evaporated. The residue is crystallized from acetone/benzene to give 0.11 gram of 20-methyl-5α-pregnane-3β,16α-20-triol melting at 235–240° C. The found analytical values of 75.23% C and 11.06% H are in agreement with the calculated values for the compound of empirical formula $C_{22}H_{38}O_3$ and the infrared spectrum is in agreement with the pattern expected. A mixture of this compound with that prepared in Example 2 shows no depression of the melting point.

*Example 7.—20-methyl-16α,20-dihydroxy-4-pregnen-3-one*

A mixture of 1.0 gram of 16α-acetoxyprogesterone, 3.0 ml. of triethyl orthoformate, 4 ml. of anhydrous dioxane, and 2 drops of anhydrous ethanol is stirred at 20° C. while 0.2 ml. of 10% sulfuric acid in dioxane solution is added dropwise. The reaction mixture slowly turns deep red. After 25 minutes at 20° C., the reaction is quenched by the addition of 0.5 ml. of pyridine. The mixture is then diluted with ether and water. The ether layer containing the desired product is washed with water, sodium bicarbonate solution, and again with water. After drying the ether solution, the solvent is evaporated in vacuo to leave a residue of white crystalline 16α-acetoxy-3-ethoxy-3,5-pregnadien-20-one which is identified by its infrared absorption pattern, showing maxima at 5.80μ, 5.89μ, 6.08μ and 6.17μ.

The above intermediate is dissolved in 150 ml. of anhydrous ether and stirred at 10° C. while adding 120 ml. of anhydrous ether containing 0.05 mole of methylmagnesium bromide. The reaction mixture is stirred for 30 minutes at room temperature and then placed in a separatory funnel together with water. The ether layer is washed with ammonium chloride solution and subsequently with water. Upon concentrating the solution, a crystalline residue of 20-methyl-3-ethoxy-3,5-pregnadiene-16α,20-diol is obtained which is identified by its infrared absorption pattern. It has a melting point of 174° C., $[\alpha]_D^{26}$ of —144° (as a 1% solution in chloroform), and the analysis is in agreement with the values calculated from the formula $C_{24}H_{38}O_3$.

A solution of 0.3 gram of this material, 15 ml. of methanol, and 1 ml. of 0.05 N hydrochloric acid is left at room temperature for 16 hours, whereby the enol-ether hydrolyzes. The mixture is then diluted with 100 ml. of ether and the ether solution is washed in sequence with aqueous sodium bicarbonate solution and water. Evaporation of the solvent leaves 20-methyl-16α,20-dihydroxy-4-pregnen-3-one melting at 191–192° C., which is identified by its infrared absorption pattern.

*Example 8.—3β-acetoxy-16α-benzyloxy-20-methyl-5α-pregnan-20-ol*

In analogy to Example 3 but using 3β-acetoxy-16α-benzyloxy-5α-pregnan-20-one (see Schwarz, Coll. Czech. Chem. Comm., volume 23, page 942, of 1958), 3β-acetoxy-16α-benzyloxy-20-methyl-5α-pregnan-20-ol is obtained in similar yield. The analytical values are in agreement with the calculated values for the compound of empirical formula $C_{31}H_{46}O_4$.

It will be appreciated by those skilled in the art that reductive debenzylation of the compound of Example 3 produces 3β - acetoxy-20-methyl-5-pregnene-16α,20-diol and that the same procedure employed on the compound of Example 8 produces 3β-acetoxy-20-methyl-5α-pregnane-16α,20-diol. If the compound of Example 8 is hydrolyzed according to Example 2, 16α-benzyloxy-20-methyl-5α-pregnane-3β,20-diol is obtained.

Oxidation of 16α-benzyloxy-20-methyl-5α-pregnane-3β,20-diol with an equal weight of chromic anhydride (an excess) in dilute acetic acid solution at room temperature for 4 hours, followed by dilution with water, extraction with ether and concentration of the ether solution, gives a residue of 16α-benzyloxy-20-methyl-5α-pregnan-20-ol-3-one. This can be identified by its infrared band at 5.86μ and by analytical values corresponding to the formula $C_{29}H_{42}O_3$.

When 16α-benzyloxy-20-methyl-5α-pregnan-20-ol-3-one is dissolved in methanol and the solution shaken with 2% palladium on charcoal catalyst until one mole-equivalent of hydrogen is used, and the reaction mixture worked up by the general procedure of Example 5, the product is 16α,20-dihydroxy-20-methyl-5α-pregnan-3-one, having the formula $C_{29}H_{42}O_3$.

It is to be understood that the enol-ethers such as that described in Example 7 and similar ones are within the spirit of this invention. These enol-ethers are compounds which hydrolyze very easily in the presence of an acid into the 3-oxo-Δ⁴-steroids.

It will also be appreciated by the skilled artisan that the 3-position and/or 16-position of 20-methyl-5α-(or Δ⁵-)pregnane-3β,16α,20-triol can be alkylated or acylated by conventional methods. Particularly valuable are the derivatives produced thereby carrying in the 3- and/or the 16-position an acyloxy group of a lower fatty acid of 2 to 4 carbon atoms, e.g., the dipropionate or dibutyrate of 20-methyl-5α-(or Δ⁵-)pregnane-3β,16α,20-triol. The diesters or the 3β-mono- or the 16α-monoesters of the 20-methyl-5α-(or Δ⁵-)pregnane-3β,16α,20-triol can be obtained and separated by the method of Neher et al. described in Helv. Chim. Acta, volume 41, page 1689 (1958).

Others may practice the present invention in any of the numerous ways which will be suggested to one skilled in the art by the present disclosure. All such practice of the invention is considered a part hereof provided it falls within the scope of the appended claims.

We claim:
1. A steroid of the formula

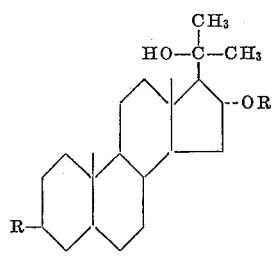

wherein R is selected from the group consisting of hydroxy, oxo, and R″COO, and R′ is selected from the group consisting of hydrogen, R″CO, and benzyl, wherein each R" represents loweralkyl, and wherein the A/R-rings have a configuration selected from the group consisting of

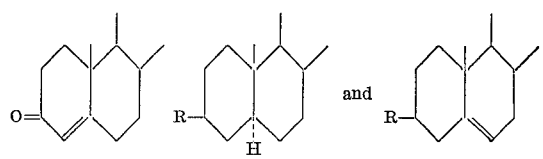

2. 10-methyl-5α-pregnane-3β,16α,20-triol.
3. 3β,16α-diacetoxy-20-methyl-5α-pregnan-20-ol.
4. 3β - acetoxy - 16α-benzyloxy-20-methyl-5-pregnen-20-ol.
5. 16α-benzyloxy-20-methyl-5-pregnene-3β,20-diol.
6. 20-methyl-5-pregnene-3β,16α,20-triol.
7. 3β - acetoxy-16α-benzyloxy-20-methyl-5α-pregnan-20-ol.
8. 16α,20-dihydroxy-20-methyl-4-pregnen-3-one.
9. 16α,20-dihydroxy-20-methyl-5α-pregnan-3-one.

References Cited by the Examiner

Fieser et al., "Steroids," 1959, page 626, Reinhold Publishing Corp., New York, New York.

LEWIS GOTTS, *Primary Examiner.*

UNITED STATES PATENT OFFICE
CERTIFICATE OF CORRECTION

Patent No. 3,218,341                                    November 16, 1965

Leslie A. Freiberg et al.

It is hereby certified that error appears in the above numbered patent requiring correction and that the said Letters Patent should read as corrected below.

Column 4, lines 62 to 72, for that portion of the formula reading

--OR                  read                  --OR′ column 5, line 1, for "A/R-rings" read -- A/B-rings --; line 9, for "10-methyl" read -- 20-methyl --.

Signed and sealed this 27th day of September 1966.

(SEAL)
Attest:

ERNEST W. SWIDER                                EDWARD J. BRENNER
Attesting Officer                                       Commissioner of Patents